(12) United States Patent
Fukazawa et al.

(10) Patent No.: US 11,613,151 B2
(45) Date of Patent: Mar. 28, 2023

(54) SUSPENSION APPARATUS AND RECORDING MEDIUM

(71) Applicant: Showa Corporation, Gyoda (JP)

(72) Inventors: Taiji Fukazawa, Fukuroi (JP); Kota Suzuki, Fukuroi (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 400 days.

(21) Appl. No.: 16/669,153

(22) Filed: Oct. 30, 2019

(65) Prior Publication Data

US 2020/0062070 A1 Feb. 27, 2020

Related U.S. Application Data

(63) Continuation of application No. PCT/JP2017/025768, filed on Jul. 14, 2017.

(30) Foreign Application Priority Data

Jul. 5, 2017 (JP) .............................. JP2017-131972

(51) Int. Cl.
   *B60G 17/016* (2006.01)
(52) U.S. Cl.
   CPC ................................ *B60G 17/0164* (2013.01)
(58) Field of Classification Search
   None
   See application file for complete search history.

(56) References Cited

U.S. PATENT DOCUMENTS

| 5,701,245 A | * | 12/1997 | Ogawa | B60G 17/0165 |
| | | | | 280/5.515 |
| 2009/0062984 A1 | * | 3/2009 | Poilbout | B60G 17/019 |
| | | | | 701/37 |
| 2012/0053791 A1 | * | 3/2012 | Harada | B60T 8/4031 |
| | | | | 701/38 |
| 2015/0066295 A1 | * | 3/2015 | Kanda | B60G 17/01933 |
| | | | | 701/38 |

(Continued)

FOREIGN PATENT DOCUMENTS

| JP | H03-243412 A | 10/1991 |
| JP | H07-002130 A | 1/1995 |
| JP | 2006-321258 A | 11/2006 |

(Continued)

OTHER PUBLICATIONS

International Preliminary Report on Patentability dated Mar. 1, 2018 for the corresponding PCT International Patent Application No. PCT/JP2017/025768.

(Continued)

*Primary Examiner* — Lail A Kleinman

(74) *Attorney, Agent, or Firm* — Leason Ellis LLP; Edward J. Ellis; Melvin C. Garner

(57) ABSTRACT

A suspension apparatus includes: a damping device which damps a force generated between a vehicle body and a wheel; and a control section which controls a damping force of the damping device. The control section includes a multiplication section which multiplies a longitudinal acceleration of the vehicle body detected by a longitudinal acceleration sensor and a differential value of the longitudinal acceleration to thereby obtain a multiplication value.

10 Claims, 12 Drawing Sheets

(56) References Cited

U.S. PATENT DOCUMENTS

2016/0272033 A1    9/2016    Nedachi et al.
2017/0320475 A1    11/2017    Kondo

FOREIGN PATENT DOCUMENTS

| JP | 2007-040497 A | 2/2007 |
| JP | 2007-153187 A | 6/2007 |
| JP | 2011-173503 A | 9/2011 |
| JP | 2016-141222 A | 8/2016 |
| JP | 2016-175467 A | 8/2016 |

OTHER PUBLICATIONS

International Search Report dated Sep. 12, 2017 for the corresponding International Application No. PCT/JP2017/025768.

* cited by examiner

SUSPENSION APPARATUS AND RECORDING MEDIUM

CROSS-REFERENCE TO RELATED APPLICATIONS

This application is a continuation of PCT application No. PCT/JP2017/025768 filed on Jul. 14, 2017, which is based upon and claims the benefit of priority to Japanese Patent Application No. 2017-131972 filed on Jul. 5, 2017, the contents of which are incorporated herein by reference.

TECHNICAL FIELD

The present invention relates to a suspension apparatus and a recording medium.

BACKGROUND ART

There has been proposed a technique for variably controlling a damping force of a variable damping force damper provided in a suspension (suspension apparatus) of a vehicle in accordance with a motion state of the vehicle. The variable damping force damper is a damper whose damping force can be variably changed.

For example, an apparatus described in PTL 1 is configured as follows. That is, the apparatus is a variable damping force damper provided in a suspension apparatus of a vehicle so that a damping force of the damper is variably controlled in accordance with a motion state of the vehicle by a control means, and the control means controls the damping force of the damper based on a differential value of a longitudinal acceleration of the vehicle which is detected by a longitudinal acceleration sensor and then subjected to differential processing by a differential filter.

PTL 1: JP-A-2006-321258

When the damping force is controlled by use of the differential value of the longitudinal acceleration, it is important to accurately determine whether sudden deceleration has been attempted or not, in order to increase the damping force in an early stage without generating any response delay on the occasion of the sudden deceleration. When the sudden deceleration has been attempted, it is preferable to increase the damping force in order to settle down pitching motion smoothly. On the other hand, when the sudden deceleration has not been attempted, it is preferable to suppress shock absorbing performance from deteriorating due to the increase of the damping force.

An object of the present invention is to provide a suspension apparatus etc. which can accurately determine whether sudden deceleration has been attempted or not, and settle down pitching motion smoothly when the sudden deceleration has been attempted.

SUMMARY OF INVENTION

According to the present invention which has been completed for achievement of the foregoing object, there is provided a suspension apparatus including: a damping device which damps a force generated between a vehicle body and a wheel; and a control section which controls a damping force of the damping device; wherein: the control section includes a multiplication section which multiplies a longitudinal acceleration of the vehicle body detected by a longitudinal acceleration sensor and a differential value of the longitudinal acceleration to thereby obtain a multiplication value.

Here, configuration may be made so that when an absolute value of the multiplication value is equal to or larger than a predetermined value determined in advance, the control section makes the damping force larger than the damping force when the absolute value is smaller than the predetermined value.

Moreover, configuration may be made so that when the longitudinal acceleration detected by the longitudinal acceleration sensor is equal to or lower than a predetermined acceleration determined in advance, the control section makes the damping force smaller than the damping force when the longitudinal acceleration is higher than the predetermined acceleration.

Further, configuration may be made so that the control section corrects a base damping force based on a change velocity of a relative displacement between the vehicle body and the wheel by use of the multiplication value, to thereby control the damping force of the damping device.

Further, configuration may be made so that the control section corrects a base damping force based on a change velocity of a relative displacement between the vehicle body and the wheel by use of the multiplication value and the longitudinal acceleration detected by the longitudinal acceleration sensor, to thereby control the damping force of the damping device.

Further, configuration may be made so that when a speed of the vehicle body is higher than a predetermined speed determined in advance, the control section makes the damping force larger than the damping force when the speed of the vehicle body is equal to or lower than the predetermined speed.

In addition, according to the present invention, there is provided a non-transitory computer-readable recording medium having a program recorded therein, the program making a computer implement a function in which a damping force of a damping device damping a force generated between a vehicle body and a wheel is controlled by use of a multiplication value obtained by multiplying a longitudinal acceleration of the vehicle body detected by a longitudinal acceleration sensor and a differential value of the longitudinal acceleration.

According to the present invention, it is possible to provide a suspension apparatus etc. which can accurately determine whether sudden deceleration has been attempted or not, so as to settle down pitching motion smoothly when the abrupt deceleration has been attempted.

DESCRIPTION OF EMBODIMENT

An embodiment of the present invention will be described below in detail with reference to the accompanying drawings.

Figure 1:
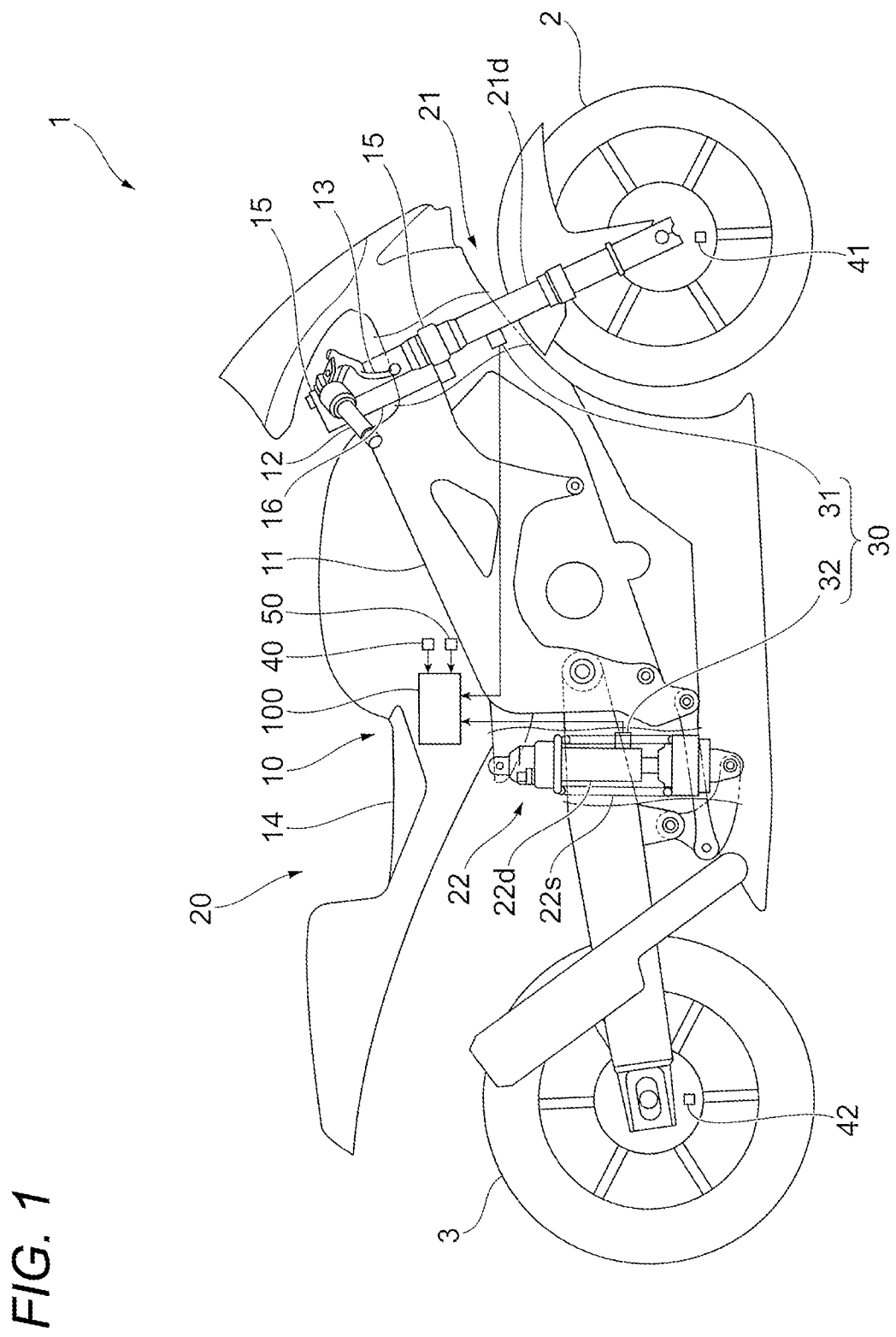
FIG. 1 is a view showing a schematic configuration of a motorcycle according to the present embodiment.

FIG. 1 is a view showing a schematic configuration of a motorcycle 1 according to the present embodiment.

The motorcycle 1 is provided with a front wheel 2, a rear wheel 3, and a vehicle body 10. The front wheel 2 is a wheel on a front side. The rear wheel 3 is a wheel on a rear side. The vehicle body 10 has a vehicle body frame 11, handles 12, brake levers 13, a seat 14, etc. The vehicle body frame 11 forms a frame of the motorcycle 1.

In addition, the motorcycle 1 has front wheel-side suspensions 21 coupling the front wheel 2 and the vehicle body 10 to each other. In addition, the motorcycle 1 is provided with two brackets 15 which retain the suspension 21 disposed on a left side of the front wheel 2 and the suspension 21 disposed on a right side of the front wheel 2, and a shaft 16 which is disposed between the two brackets 15. The shaft 16 is supported on the vehicle body frame 11 rotatably. Each suspension 21 is provided with a suspension spring (not shown) absorbing shock applied from a road surface etc. to the front wheel 2, and a damping device 21d damping vibration of the suspension spring.

In addition, the motorcycle 1 has a rear wheel-side suspension 22 coupling the rear wheel 3 and the vehicle body 10 to each other. The suspension 22 is provided with a suspension spring 22s absorbing shock applied from the road surface etc. to the rear wheel 3, and a damping device 22d damping vibration of the suspension spring 22s.

In the following description, the damping device 21d and the damping device 22d may be generically referred to as "damping device 200".

In addition, the front wheel-side suspension 21 and the rear wheel-side suspension 22 may be generically referred to as "suspension". In addition, the front wheel 2 and the rear wheel 3 may be generically referred to as "wheel".

Figure 2:
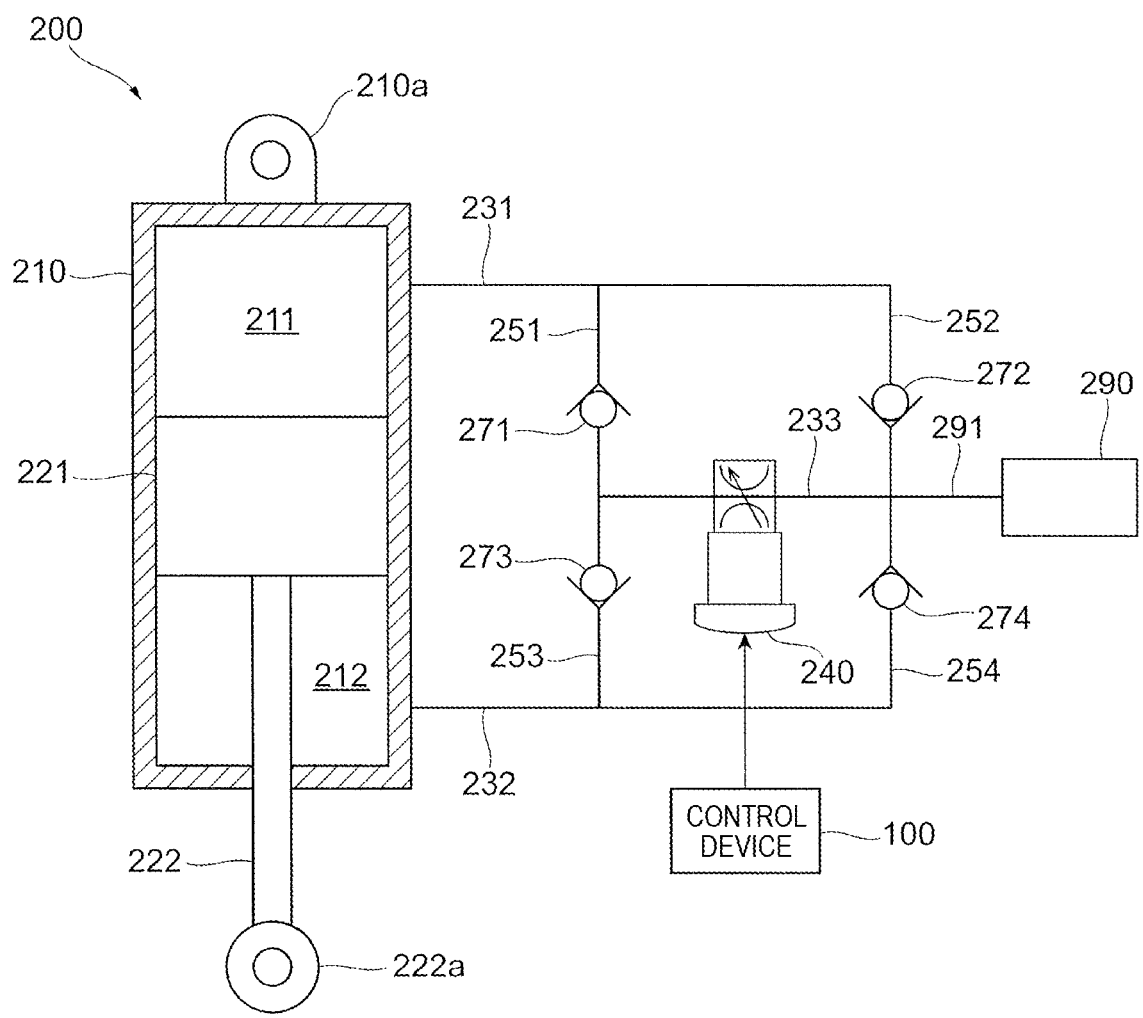
FIG. 2 is a view showing a schematic configuration of a damping device.
Figure 3:
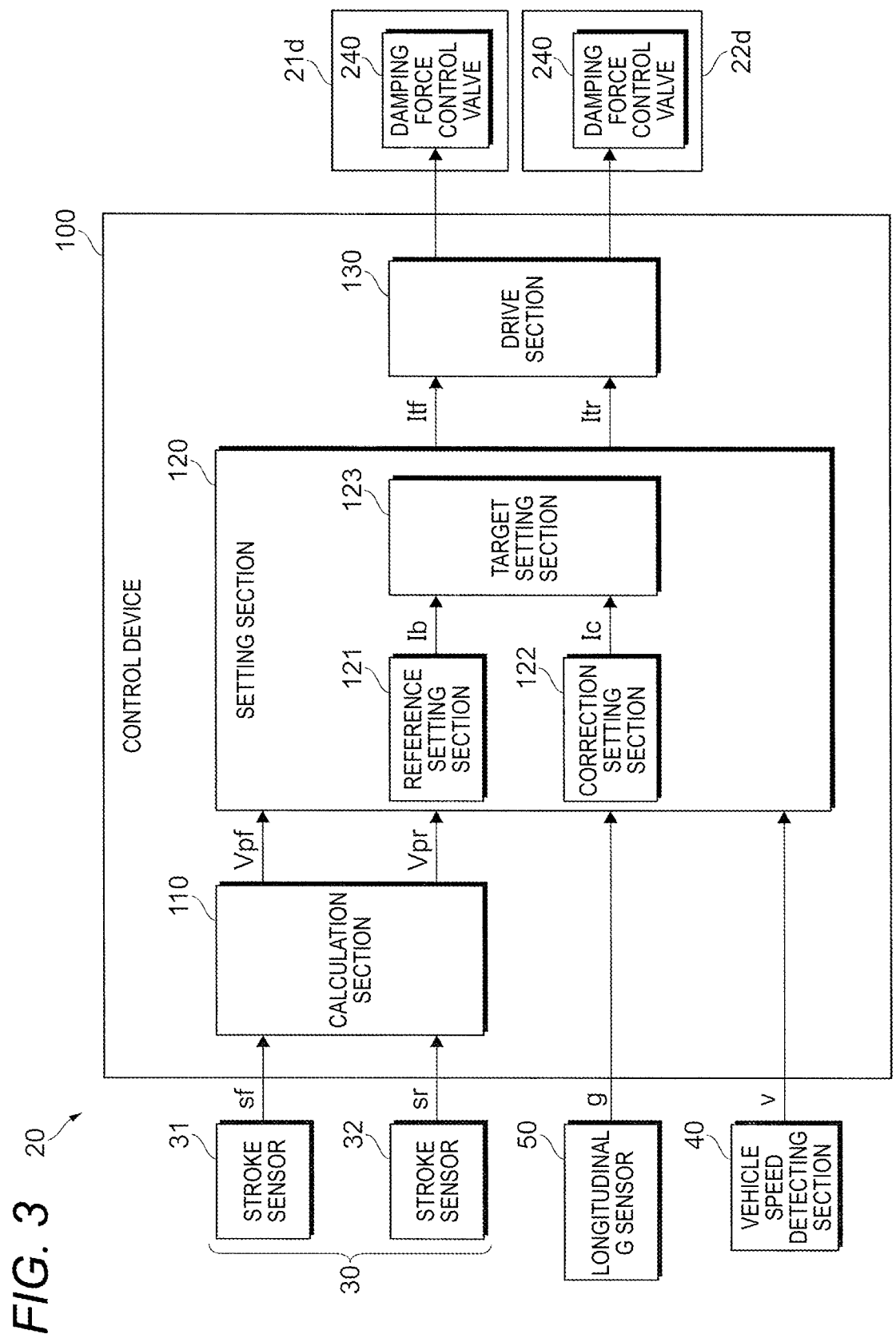
FIG. 3 is a diagram of a schematic configuration of a control device.

FIG. 2 is a view showing a schematic configuration of the damping device 200. FIG. 3 is a diagram of a schematic configuration of a control device 100.

The motorcycle 1 is provided with the control device 100 controlling damping forces of the damping device 21d and the damping device 22d. Output signals from a stroke sensor 31 detecting an extension/compression amount of the suspension 21, and a stroke sensor 32 detecting an extension/compression amount of the suspension 22 are inputted to the control device 100. In the following description, the stroke sensor 31 and the stroke sensor 32 may be generically referred to as "stroke sensor 30".

In addition, a vehicle speed signal v from a vehicle speed detecting section 40 detecting a vehicle speed Vc which is a movement speed of the motorcycle 1, an output signal g from a longitudinal G sensor 50 as an example of a longitudinal acceleration sensor which detects a longitudinal acceleration, etc. are inputted to the control device 100. The vehicle speed detecting section 40 detects the vehicle speed Vc based on output values from a rotation angle detecting sensor 41 detecting a rotation angle of the front wheel 2 and a rotation angle detecting sensor 42 detecting a rotation angle of the rear wheel 3.

A suspension apparatus 20 according to the present invention is an apparatus having the suspension (the suspension 21 and the suspension 22), the stroke sensor 30, the vehicle speed detecting section 40, the longitudinal G sensor 50, and the control device 100.

(Damping Device)

The damping device 200 is provided with a cylinder 210 filled with working oil, a piston 221 received movably inside the cylinder 210, and a piston rod 222 retaining the piston 221. One side (upper side in FIG. 2) end portion 210a of the cylinder 210 is coupled to the vehicle body 10. The piston rod 222 retains the piston 221 at its one side end portion, and has the other side (lower side in FIG. 2) end portion 222a coupled to the wheel. Incidentally, the damping device in the present invention is not limited to such a form. The damping device in the present invention may have a configuration in which the other side end portion of the cylinder 210 is coupled to the wheel, and the other side end portion of the piston rod 222 retains the piston 221 while the one side end portion of the piston rod 222 is coupled to the vehicle body 10.

In the damping device 200, a compression stroke is performed in order to move the piston 221 toward the vehicle body 10 side (the upper side in FIG. 2) to thereby reduce the entire length of the damping device 200, and an extension stroke is performed in order to move the piston 221 toward the wheel side (the lower side in FIG. 2) to thereby increase the entire length of the damping device 200.

By the piston 221 received inside the cylinder 210, the cylinder 210 is internally sectioned into a compression-side oil chamber 211 and an extension-side oil chamber 212. Pressure of the working oil in the compression-side oil chamber 211 increases in the compression stroke. Pressure of the working oil in the extension-side oil chamber 212 increases in the extension stroke.

The damping device 200 has a first oil path 231 which is connected to the oil chamber 211 inside the cylinder 210, and a second oil path 232 which is connected to the oil chamber 212 inside the cylinder 210. In addition, the damping device 200 has a third oil path 233 which is provided between the first oil path 231 and the second oil path 232, and a damping force control valve 240 which is provided in the third oil path 233. In addition, the damping device 200 has a first branch path 251 which connects the first oil path 231 and one end portion of the third oil path 233 to each other, and a second branch path 252 which connects the first oil path 231 and the other end portion of the third oil path 233 to each other. In addition, the damping device 200 has a third branch path 253 which connects the second oil path 232 and the one end portion of the third oil path 233 to each other, and a fourth branch path 254 which connects the second oil path 232 and the other end portion of the third oil path 233 to each other.

In addition, the damping device 200 has a first check valve 271 which is provided in the first branch path 251 and which allows the working oil to move from the first oil path 231 toward the third oil path 233 and prohibits the working oil from moving from the third oil path 233 toward the first oil path 231. In addition, the damping device 200 has a second check valve 272 which is provided in the second branch path 252 and which allows the working oil to move from the third oil path 233 toward the first oil path 231 and prohibits the working oil from moving from the first oil path 231 toward the third oil path 233.

In addition, the damping device 200 has a third check valve 273 which is provided in the third branch path 253 and which allows the working oil to move from the second oil path 232 toward the third oil path 233 and prohibits the working oil from moving from the third oil path 233 toward the second oil path 232. In addition, the damping device 200 has a fourth check valve 274 which is provided in the fourth branch path 254 and which allows the working oil to move from the third oil path 233 toward the second oil path 232 and prohibits the working oil from moving from the second oil path 232 toward the third oil path 233.

In addition, the damping device 200 has a reservoir 290 and a reservoir passage 291. The reservoir 290 has a function for storing the working oil and supplying/discharging the working oil. The reservoir passage 291 connects the reservoir 290 and the other end portion of the third oil path 233 to each other.

The damping force control valve 240 has a solenoid. By control of an amount of a current conducted to the solenoid, pressure of the working oil passing through the valve can be controlled. The amount of the current conducted to the solenoid is controlled by the control device 100. When oil pressure of one of the oil chamber 211 and the oil chamber 212 of the cylinder 210 becomes higher than releasing pressure, the damping force control valve 240 allows the working oil to flow into the other oil chamber. That is, when the oil pressure of the oil chamber 211 becomes higher than the releasing pressure, the damping force control valve 240 allows the working oil to flow into the oil chamber 212. Thus, the damping force control valve 240 changes a damping force (compression-side damping force) generated when the damping device 200 is in the compression stroke. In addition, when the oil pressure of the oil chamber 212 becomes higher than the releasing pressure, the damping force control valve 240 allows the working oil to flow into the oil chamber 211. Thus, the damping force control valve 240 changes a damping force (extension-side damping force) generated when the damping device 200 is in the extension stroke.

More specifically, when the piston 221 moves toward the oil chamber 211, the oil pressure of the oil chamber 211 increases. The working oil inside the oil chamber 211 moves toward the damping force control valve 240 through the first oil path 231 and the first branch path 251. The pressure of the working oil passing through the damping force control valve 240 is adjusted by valve pressure of the damping force control valve 240. Thus, the compression-side damping force is adjusted. The working oil passing through the damping force control valve 240 flows into the oil chamber 212 through the fourth branch path 254 and the second oil path 232.

On the other hand, when the piston 221 moves toward the oil chamber 212, the oil pressure of the oil chamber 212 increases. The working oil inside the oil chamber 212 moves toward the damping force control valve 240 through the second oil path 232 and the third branch path 253. The pressure of the working oil passing through the damping force control valve 240 is adjusted by the valve pressure of the damping force control valve 240. Thus, the extension-side damping force is adjusted. The working oil passing through the damping force control valve 240 flows into the oil chamber 211 through the second branch path 252 and the first oil path 231.

(Control Device 100)

The control device 100 is an arithmetic and logic circuit including a CPU, an ROM, an RAM, a backup RAM, etc.

A front wheel-side stroke signal sf in which an extension/compression amount of the suspension 21 detected by the stroke sensor 31 has been converted into an output signal, and a rear wheel-side stoke signal sr in which an extension/compression amount of the suspension 22 detected by the stroke sensor 32 has been converted into an output signal are inputted to the control device 100. In addition thereto, the vehicle speed signal v corresponding to the vehicle speed Vc from the vehicle speed detecting section 40, the output signal g from the longitudinal G sensor 50, etc. are also inputted to the control device 100.

The control device 100 is provided with a calculation section 110 which calculates stroke velocities Vpf and Vpr as change velocities of strokes detected by the stroke sensor 30. In addition, the control device 100 is provided with a setting section 120 which sets target currents Itf and Itr fed to the solenoids of the damping force control valves 240, based on the stroke velocities Vpf and Vpr calculated by the calculation section 110, the output signal g corresponding to a longitudinal acceleration Xg detected by the longitudinal G sensor 50, and the vehicle speed signal v etc. corresponding to the vehicle speed Vc sent from the vehicle speed detecting section 40. In addition, the control device 100 is provided with a drive section 130 which drives the damping force control valves 240.

The calculation section 110 differentiates an output value from the stroke sensor 31 to thereby calculate the front wheel-side stroke velocity Vpf. In addition, the calculation section 110 differentiates an output value from the stroke sensor 32 to thereby calculate the rear wheel-side stroke velocity Vpr. The stroke velocity Vpf and the stroke velocity Vpr may be generically referred to as "stroke velocity Vp".

The drive section 130 is provided with transistors (Field Effect Transistors: FETs) as switching elements, which are, for example, connected between a positive electrode side line of a power supply and coils of the solenoids of the damping force control valves 240 respectively. The drive section 130 drives gates of the transistors to enable the transistors to perform a switching operation to thereby control drive of the damping force control valves 240.

More specifically, the drive section 130 enables the transistors to perform the switching operation so that target currents fed to the damping force control valves 240 can be the target currents Itf and Itr set by the setting section 120. That is, the drive section 130 enables a corresponding one of the transistors to perform the switching operation so that the target current fed to the damping force control valve 240 of the damping device 21d can be the target current Itf set by the setting section 120. In addition, the drive section 130 enables a corresponding one of the transistors to perform the switching operation so that the target current fed to the damping force control valve 240 of the damping device 22d can be the target current Itr set by the setting section 120.

Details of the setting section 120 will be described below.

Here, when a brake operation (hard braking) is performed by squeezing the brake lever 13 strongly and for a long time, the vehicle body 10 tends to continue to move forward due to inertia, thereby resulting in occurrence of pitching motion called nosedive with a front portion of the vehicle body 10 down and a rear portion of the vehicle body 10 up. When the nosedive occurs to compress the suspension 21 suddenly, there is a fear that the front wheel 2 may slip. On the other hand, when the damping force of the damping device 200 is increased in order to suppress the nosedive, there is a fear that the force fails to be applied to the front wheel 2 so that the front wheel may slip or the rear wheel 3 may float. Therefore, in order to improve steering stability on the occasion of sudden deceleration, it is important to settle down the pitching motion smoothly.

When the damping force of the damping device 200 is controlled based on only a value of the longitudinal acceleration Xg detected by the longitudinal G sensor 50 in order to settle down the pitching motion smoothly on the occasion of the sudden deceleration, a delay occurs in the control. That is, when the deceleration is determined based on only the value of the detected longitudinal acceleration Xg, a delay occurs in grasping the sudden deceleration. Before the sudden deceleration is grasped, the suspension has already initiated a stroke. Therefore, it is difficult to settle down the pitching motion smoothly. Particularly, when the damping force is controlled by use of the output value of the longitudinal G sensor 50 which has already passed through a low pass filter, a delay occurs in grasping the sudden deceleration. Accordingly, it is difficult to smoothly settle down the pitching motion on the occasion of the deceleration.

On the other hand, when a differential value of the longitudinal acceleration Xg detected by the longitudinal G sensor 50 is used in order to compensate for the delay, it is possible to quickly grasp that the brake operation has been performed. However, it is difficult to distinguish the hard braking from a light brake operation performed by squeezing the brake lever 13 weakly or for a short period of time.

In addition, it may be also considered that a damping force as the sum of a damping force corresponding to the longitudinal acceleration Xg and a damping force corresponding to the differential value of the longitudinal acceleration Xg is set as the damping force on the occasion of the sudden deceleration (e.g. a current value as the sum of a current value corresponding to the longitudinal acceleration Xg and a current value corresponding to the differential value of the longitudinal acceleration Xg is fed to the solenoid of the damping force control valve 240 to thereby generate the damping force on the occasion of the sudden deceleration). However, in the control of such a case, it is considered that the control for the occasion of the sudden deceleration also works in an occasion of gentle deceleration, an occasion of making a turn or an occasion of passing through a gap in a road surface. For example, the suspension does not make a stroke not only immediately after the brake operation but also during deceleration with the fixed longitudinal acceleration Xg after that. Accordingly, there is a fear that the control for the occasion of the sudden deceleration may work despite that it seldom has an effect even if the damping force of the suspension is increased. In addition, when the damping force is increased on the occasion of passing through the gap in the road surface, shock absorbing performance of the suspension deteriorates.

From earnest research which has been made by the present inventor, the following thing has been found out. That is, sudden deceleration is grasped by use of a value obtained by multiplying the longitudinal acceleration Xg and the differential value of the longitudinal acceleration Xg. Accordingly, it is possible to distinguish the hard braking from a light brake operation, and it is possible to distinguish the occasion of gentle deceleration, the occasion of making the turn or the occasion of passing through the gap in the road surface. For example, when the value obtained by multiplying the longitudinal acceleration Xg and the differential value of the longitudinal acceleration Xg exceeds a predetermined value, it is possible to accurately grasp that the brake operation is not the light brake operation, the occasion of gentle deceleration, the occasion of making the turn or the occasion of passing through the gap in the road surface but hard braking.

Therefore, the control device 100 according to the present embodiment is characterized by having a differential value multiplication section 143 (see FIG. 5) as an example of a multiplication section which multiplies the longitudinal acceleration Xg of the vehicle body 10 detected by the longitudinal G sensor 50 and the differential value of the longitudinal acceleration Xg to obtain a multiplication value, in order to settle down the pitching motion smoothly to improve the steering stability on the occasion of the sudden deceleration.

The setting section 120 will be described more specifically below.

The setting section 120 sets the front wheel-side target current Itf fed to the solenoid of the damping force control valve 240 of the damping device 21d, based on the front wheel-side stroke velocity Vpf calculated by the calculation section 110 and the output signal g etc. from the longitudinal G sensor 50. In addition, the setting section 120 sets the rear wheel-side target current Itr fed to the solenoid of the damping force control valve 240 of the damping device 22d, based on the rear wheel-side stroke velocity Vpr calculated by the calculation section 110 and the output signal g etc. from the longitudinal G sensor 50. Incidentally, a technique of setting the target current Itf by the setting section 120 and a technique of setting the target current Itr by the setting section 120 are similar or the same. In the following description, the target current Itf and the target current Itr may be generically referred to as "target current It".

The setting section 120 has a reference setting section 121 and a correction setting section 122. The reference setting section 121 sets a reference current Ib as a reference in setting the target current It. The correction setting section 122 sets a correction current Ic for correcting the reference current Ib in order to increase the damping force on the occasion of the sudden deceleration.

In addition, the setting section 120 has a target setting section 123. The target setting section 123 adds the reference current Ib set by the reference setting section 121 and the correction current Ic set by the correction setting section 122 to thereby finally set the target current It.

Figure 4:
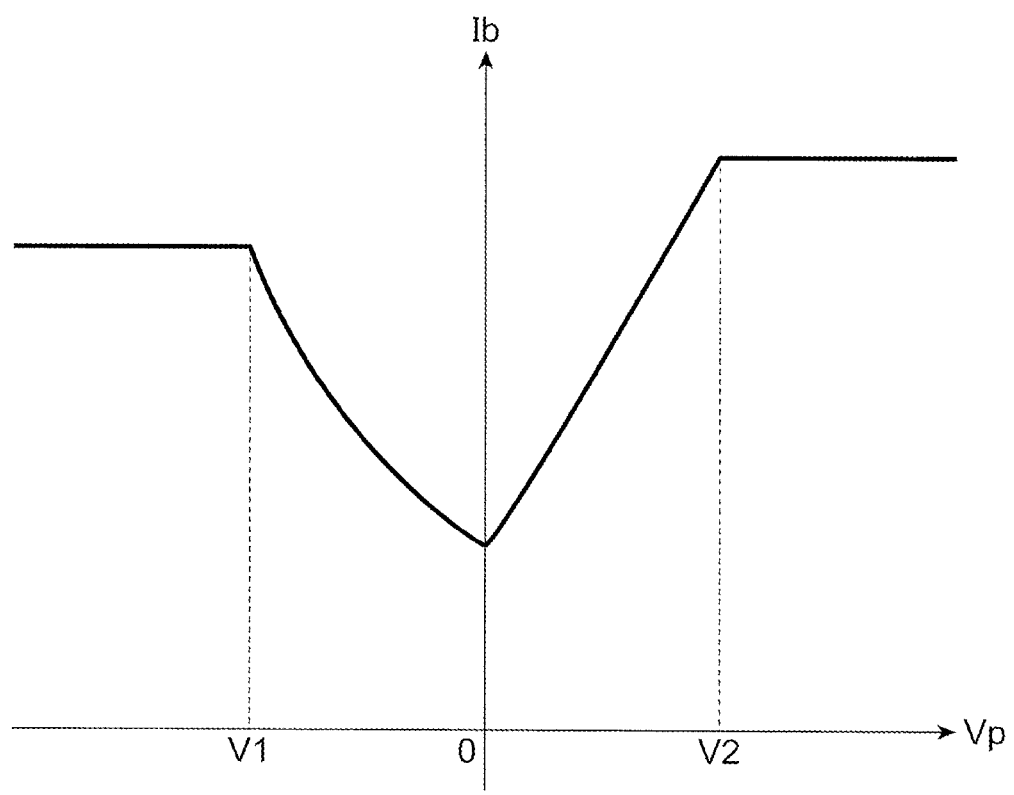
FIG. 4 is a schematic view of a control map showing an example of the relation between a reference current and a stroke velocity.

FIG. 4 is a schematic view of a control map showing an example of the relation between the reference current Ib and the stroke velocity Vp.

The reference setting section 121 calculates the reference current Ib corresponding to the stroke velocity Vp (the stroke velocity Vpf or the stroke velocity Vpr). The reference setting section 121 substitutes the stroke velocity Vp into the control map illustrated in FIG. 4 to thereby calculate the reference current Ib. The control map shows the relation between the reference current Ib and the stroke velocity Vp, and has been, for example, created based on a rule of thumb and stored in an ROM in advance.

Assume that the stroke velocity Vp is a velocity of the suspension in a compression direction in the control map illustrated in FIG. 4. In this case, setting is performed as follows. That is, when the stroke velocity Vp is equal to or higher than a first predetermined velocity V1, an amount of the current increases as the stroke velocity Vp decreases. When the stroke velocity Vp is lower than the first predetermined velocity V1, the amount of the current is constant. In addition, assume that the stroke velocity Vp is a velocity of the suspension in an extension direction. In this case, setting is performed as follows. That is, when the stroke velocity Vp is equal to or lower than a second predetermined velocity V2, the amount of the current increases as the stroke velocity Vp increases. When the stroke velocity Vp is higher than the second predetermined velocity V2, the amount of the current is constant.

The reference setting section 121 sets the reference current Ib. In other words, this means that the reference setting section 121 sets a base damping force corresponding to the stroke velocity Vp.

Figure 5:
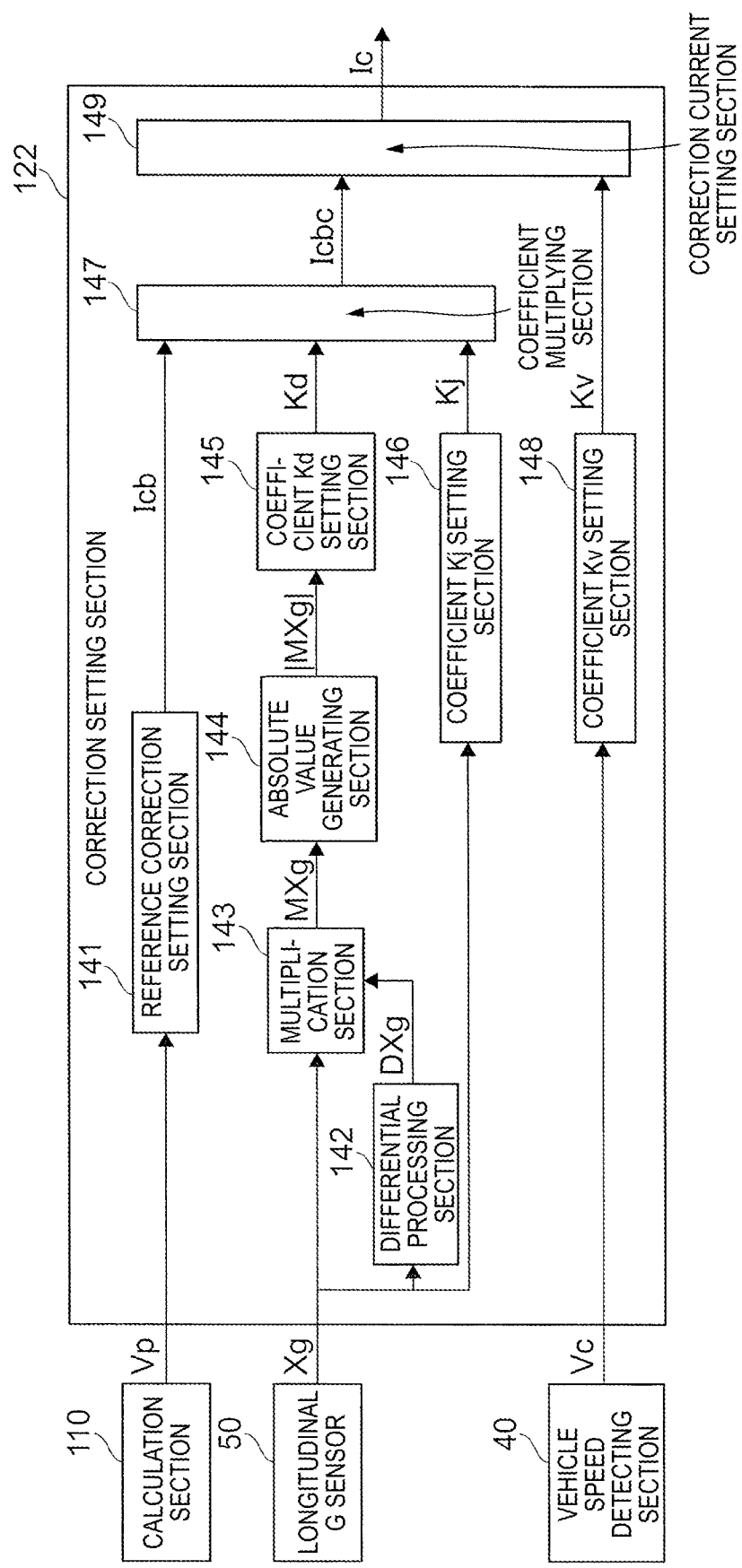
FIG. 5 is a diagram of a schematic configuration of a correction setting section.

FIG. 5 is a diagram of a schematic configuration of the correction setting section 122.

The correction setting section 122 has a reference correction setting section 141 which sets a reference correction current Icb as a reference in setting the correction current Ic.

In addition, the correction setting section 122 has a differential processing section 142 and the multiplication section 143. The differential processing section 142 applies differential processing to the longitudinal acceleration Xg detected by the longitudinal G sensor 50 to thereby obtain a differential value DXg of the longitudinal acceleration Xg. The multiplication section 143 multiplies the longitudinal acceleration Xg and the differential value DXg to thereby obtain a multiplication value MXg.

In addition, the correction setting section 122 has an absolute value generating section 144 and a coefficient Kd setting section 145. The absolute value generating section 144 generates an absolute value of the multiplication value MXg obtained by the multiplication section 143 to thereby obtain the absolute value |MXg|. The coefficient Kd setting section 145 sets a deceleration coefficient Kd as a correction coefficient corresponding to the absolute value |MXg| obtained by the absolute value generating section 144.

In addition, the correction setting section 122 has a coefficient Kj setting section 146 which sets a deceleration determination coefficient Kj as a correction coefficient corresponding to the absolute value of the longitudinal acceleration Xg.

In addition, the correction setting section 122 has a coefficient multiplying section 147 which multiplies the reference correction current Icb set by the reference correction setting section 141, the deceleration coefficient Kd set by the coefficient Kd setting section 145 and the deceleration determination coefficient Kj set by the coefficient Kj setting section 146, to thereby obtain a multiplication value Icbc.

In addition, the correction setting section 122 has a coefficient Kv setting section 148 and a correction current setting section 149. The coefficient Kv setting section 148 sets a vehicle speed coefficient Kv as a correction coefficient corresponding to the vehicle speed Vc detected by the vehicle speed detecting section 40. The correction current setting section 149 finally sets the correction current Ic based on the multiplication value Icbc obtained by the coefficient multiplying section 147 and the vehicle speed coefficient Kv set by the coefficient Kv setting section 148.

Figure 6:
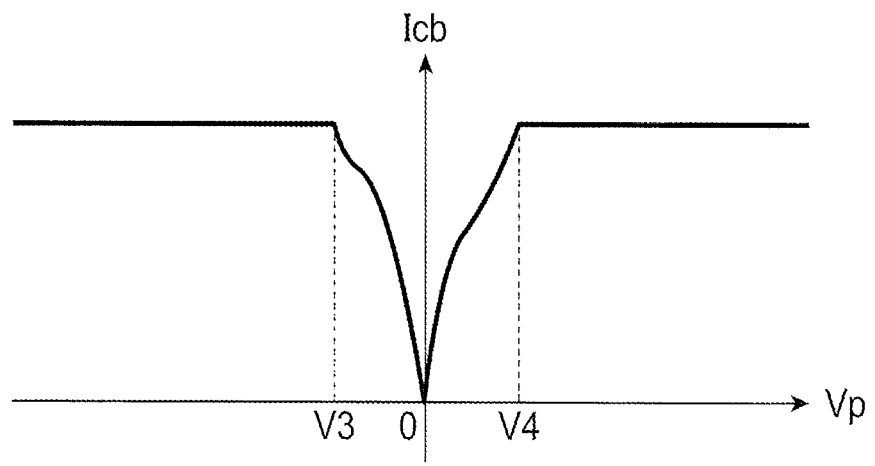
FIG. 6 is a schematic view of a control map showing an example of the relation between a reference correction current and the stroke velocity.

FIG. 6 is a schematic view of a control map showing an example of the relation between the reference correction current Icb and the stroke velocity Vp.

The reference correction setting section 141 calculates the reference correction current Icb corresponding to the stroke velocity Vp (the stroke velocity Vpf or the stroke velocity Vpr). The reference correction setting section 141 substitutes the stroke velocity Vp into the control map illustrated in FIG. 6 to thereby calculate the reference correction current Icb. The control map shows the relation between the reference correction current Icb and the stroke velocity Vp and has been, for example, created based on a rule of thumb and stored in the ROM in advance.

Assume that the stroke velocity Vp is a velocity of the suspension in the compression direction in the control map illustrated in FIG. 6. In this case, setting is performed as follows. That is, when the stroke velocity Vp is equal to or higher than a third predetermined velocity V3, an amount of the current increases as the stroke velocity Vp decreases. When the stroke velocity Vp is lower than the third predetermined velocity V3, the amount of the current is constant. In addition, assume that the stroke velocity Vp is a velocity of the suspension in the extension direction. In this case, setting is performed as follows. That is, when the stroke velocity Vp is equal to or lower than a fourth predetermined velocity V4, the amount of the current increases as the stroke velocity Vp increases. When the stroke velocity Vp is higher than the fourth predetermined velocity V4, the amount of the current is constant.

The differential processing section 142 applies differential processing to the longitudinal acceleration Xg detected by the longitudinal G sensor 50 to thereby calculate the differential value DXg of the longitudinal acceleration Xg ($DXg=dXg/dt$). Incidentally, the differential processing section 142 may apply differential processing to the longitudinal acceleration Xg detected by the longitudinal G sensor 50 and extracted by the low pass filter, to thereby calculate the differential value DXg of the longitudinal acceleration Xg. Thus, it is possible to suppress the differential processing from being applied to the high-frequency longitudinal acceleration Xg during normal travelling irrelevant to the brake operation. Here, the low pass filter is a filter which removes a larger frequency band component than a predetermined frequency (e.g. 5 Hz) to thereby extract only a low frequency band component not higher than the predetermined frequency.

The multiplication section 143 multiplies the longitudinal acceleration Xg detected by the longitudinal G sensor 50 and the differential value DXg obtained by the differential processing section 142 to thereby calculate a multiplication value MXg ($MXg=Xg \times (dXg/dt)$). Incidentally, the multiplication section 143 may multiply the longitudinal acceleration Xg detected by the longitudinal G sensor 50 and extracted by the low pass filter and the differential value DXg extracted by the low pass filter, to thereby obtain the multiplication value MXg. Thus, it is possible to suppress a situation that the multiplication value MXg is calculated based on the high-frequency longitudinal acceleration Xg during normal travelling irrelevant to the brake operation, or based on the differential value DXg.

The absolute value generating section 144 generates an absolute value of the multiplication value MXg calculated by the multiplication section 143, to thereby calculate the absolute value |MXg| of the multiplication value MXg.

Figure 7:
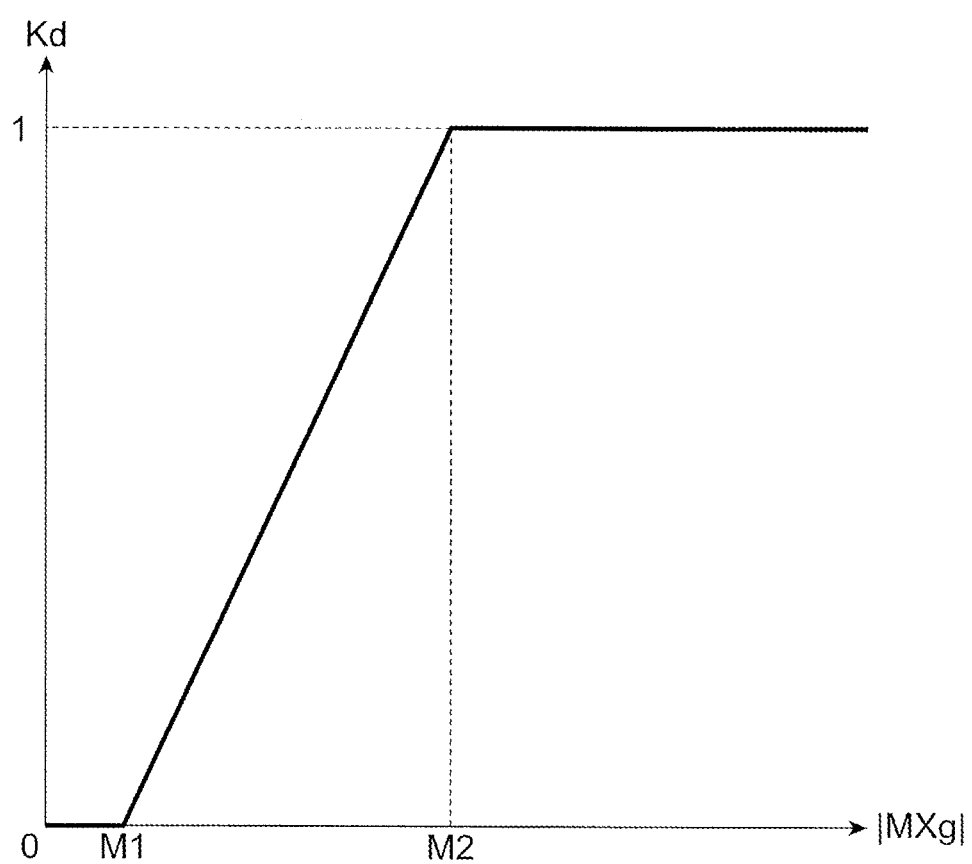
FIG. 7 is a schematic view of a control map showing an example of the relation between an absolute value of a multiplication value and a deceleration coefficient.

FIG. 7 is a schematic view of a control map showing an example of the relation between the absolute value |MXg| and the deceleration coefficient Kd.

The coefficient Kd setting section 145 calculates the deceleration coefficient Kd corresponding to the absolute value |MXg|. The coefficient Kd setting section 145 substitutes the absolute value |MXg| into the control map illustrated in FIG. 7 to thereby calculate the deceleration coefficient Kd. The control map shows the relation between the absolute value |MXg| and the deceleration coefficient Kd, and has been, for example, created based on a rule of thumb and stored in the ROM in advance.

In the control map illustrated in FIG. 7, setting is made as follows. That is, when the absolute value |MXg| is equal to or smaller than a first predetermined multiplication value Ml, the deceleration coefficient Kd is 0. When the absolute value |MXg| is equal to or larger than a second predetermined multiplication value M2, the deceleration coefficient Kd is 1. Moreover, setting is made as follows. That is, when the absolute value |MXg| is larger than the first predetermined multiplication value M1 and smaller than the second predetermined multiplication value M2, the deceleration coefficient Kd is a value larger than 0 and smaller than 1, and the deceleration coefficient Kd increases as the absolute value |MXg| increases.

Figure 8:
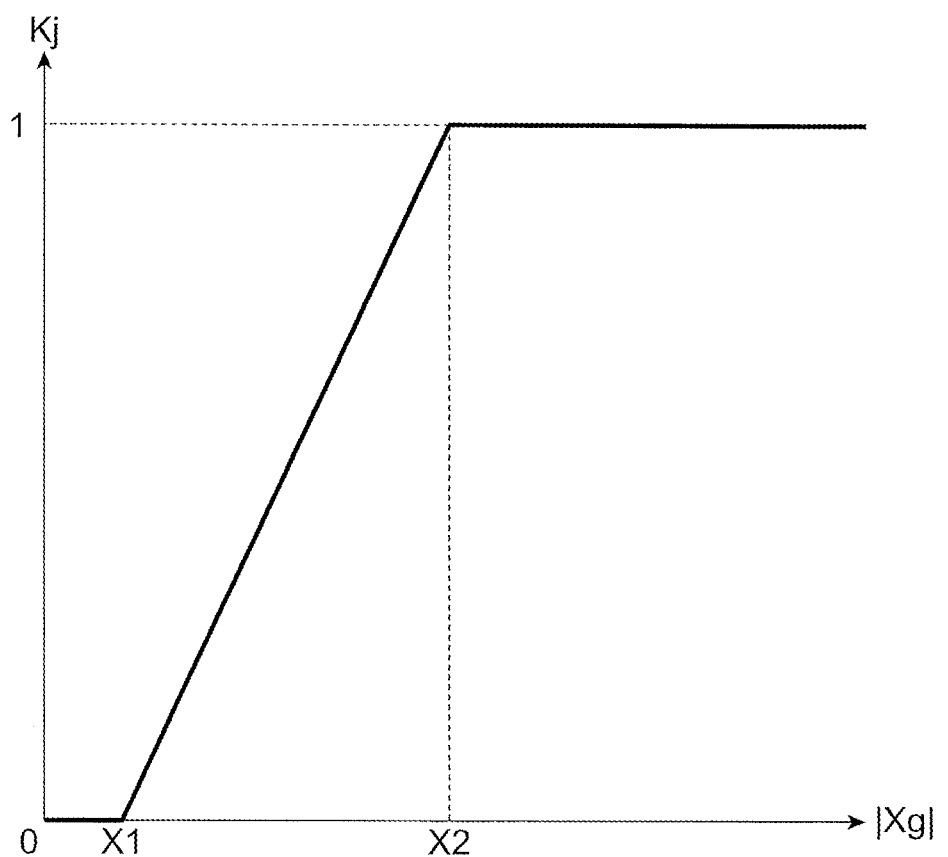
FIG. 8 is a schematic view of a control map showing an example of the relation between an absolute value of a longitudinal acceleration and a deceleration determination coefficient.

FIG. 8 is a schematic view of a control map showing an example of the relation between the absolute value |Xg| of the longitudinal acceleration Xg and the deceleration determination coefficient Kj.

The coefficient Kj setting section 146 calculates the deceleration determination coefficient Kj corresponding to the absolute value |Xg|. The coefficient Kj setting section 146 substitutes the absolute value |Xg| into the control map illustrated in FIG. 8 to thereby calculate the deceleration determination coefficient Kj. The control map shows the relation between the absolute value |Xg| and the deceleration determination coefficient Kj, and has been, for example, created based on a rule of thumb and stored in the ROM in advance.

In the control map illustrated in FIG. 8, setting is made as follows. That is, when the absolute value |Xg| is equal to or smaller than a first predetermined value Xl, the deceleration determination coefficient Kj is 0. When the absolute value |Xg| is equal to or larger than a second predetermined value X2, the deceleration determination coefficient Kj is 1. Moreover, setting is made as follows. That is, when the absolute value |Xg| is larger than the first predetermined value X1 and smaller than the second predetermined value X2, the deceleration determination coefficient Kj is a value larger than 0 and smaller than 1, and the deceleration determination coefficient Kj increases as the absolute value |Xg| increases.

The coefficient multiplying section 147 multiplies the reference correction current Icb set by the reference correction setting section 141, the deceleration coefficient Kd set by the coefficient Kd setting section 145 and the deceleration determination coefficient Kj set by the coefficient Kj setting section 146, to thereby calculate the multiplication value Icbc (Icbc=Icb×Kd×Kj).

Figure 9:
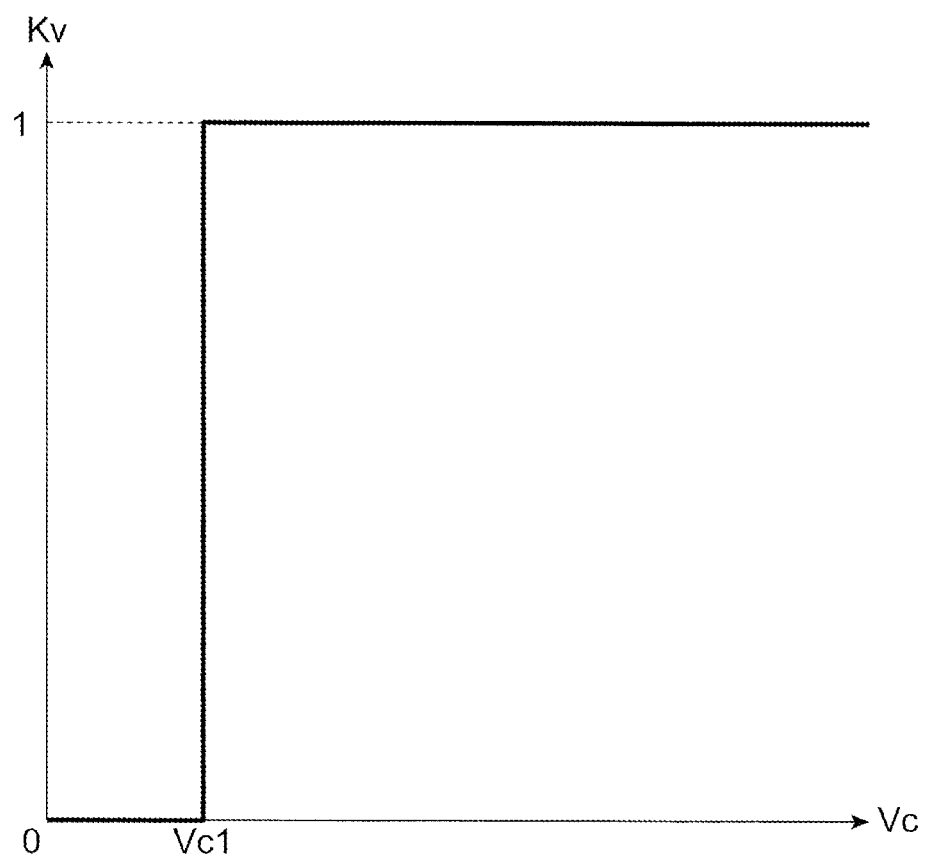
FIG. 9 is a schematic view of a control map showing an example of the relation between a vehicle speed and a vehicle speed coefficient.

FIG. 9 is a schematic view of a control map showing an example of the relation between the vehicle speed Vc and the vehicle speed coefficient Kv.

The coefficient Kv setting section 148 sets the vehicle speed coefficient Kv corresponding to the vehicle speed Vc detected by the vehicle speed detecting section 40. The coefficient Kv setting section 148 substitutes the vehicle speed Vc detected by the vehicle speed detecting section 40, into the control map illustrated in FIG. 9 to thereby obtain the vehicle speed coefficient Kv. The control map shows the relation between the vehicle speed Vc and the vehicle speed coefficient Kv, and has been, for example, created based on a rule of thumb and stored in the ROM in advance.

In the control map illustrated in FIG. 9, setting is made as follows. That is, when the vehicle speed Vc is equal to or lower than a predetermined vehicle speed Vc1, the vehicle speed coefficient Kv is 0. When the vehicle speed Vc is higher than the predetermined vehicle speed Vc1, the vehicle speed coefficient Kv is 1.

The correction current setting section 149 multiplies the multiplication value Icbc calculated by the coefficient multiplying section 147 and the vehicle speed coefficient Kv set by the coefficient Kv setting section 148, to thereby calculate the correction current Ic (Ic=Icbc×Kv=Icb×Kd×Kj×Kv). Accordingly, when a value of at least one of the deceleration coefficient Kd, the deceleration determination coefficient Kj and the vehicle speed coefficient Kv is 0, the correction current Ic is 0.

The reference correction setting section 141, the differential processing section 142, the multiplication section 143, the absolute value generating section 144, the coefficient Kd setting section 145, the coefficient Kj setting section 146, the coefficient multiplying section 147, the coefficient Kv setting section 148 and the correction current setting section 149 respectively perform the aforementioned processes, for example, every predetermined period of time (e.g. every millisecond) repetitively. In this manner, the correction setting section 122 calculates the correction current Ic every predetermined period of time (e.g. every millisecond) to thereby output the calculated correction current Ic to the target setting section 123.

The target setting section 123 sets a value obtained by adding the reference current Ib set by the reference setting section 121 and the correction current Ic set by the correction setting section 122, as the target current It (It=Ib+Ic).

Next, a sequence of a target current setting process performed by the setting section 120 will be described by use of a flow chart.

Figure 10:
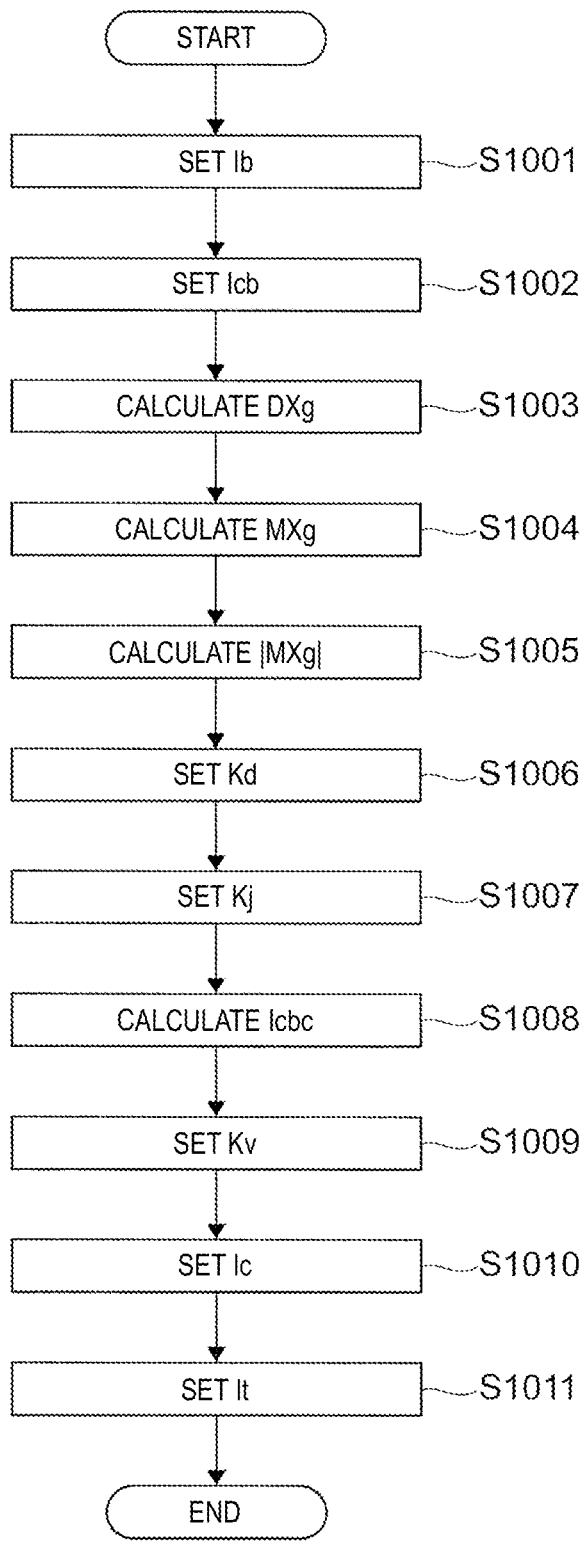
FIG. 10 is a flow chart showing a sequence of a target current setting process performed by a setting section.

FIG. 10 is a flow chart showing the sequence of the target current setting process performed by the setting section 120.

The setting section 120 executes the target current setting process every predetermined period of time (e.g. every millisecond) repetitively.

The setting section 120 sets a reference current Ib (step (which may be hereinafter referred to as "S") 1001). This is a process in which the reference setting section 121 calculates the reference current Ib as described above.

The setting section 120 sets a reference correction current Icb (S1002). This is a process in which the reference correction setting section 141 sets the reference correction current Icb.

The setting section 120 calculates a differential value DXg of a longitudinal acceleration Xg (S1003). This is a process in which the differential processing section 142 calculates the differential value DXg.

The setting section 120 calculates a multiplication value MXg (S1004). This is a process in which the multiplication section 143 multiplies the longitudinal acceleration Xg detected by the longitudinal G sensor 50 and the differential value DXg calculated in the S1003 to thereby calculate the multiplication value MXg.

The setting section 120 calculates an absolute value |MXg| of the multiplication value MXg (S1005). This is a process in which the absolute value generating section 144 calculates the absolute value |MXg| of the multiplication value MXg.

The setting section 120 sets a deceleration coefficient Kd (S1006). This is a process in which the coefficient Kd setting section 145 calculates the deceleration coefficient Kd based on the absolute value |MXg| as described above.

The setting section 120 sets a deceleration determination coefficient Kj (S1007). This is a process in which the coefficient Kj setting section 146 calculates the deceleration determination coefficient Kj based on the absolute value |Xg| as described above.

The setting section 120 calculates a multiplication value Icbc (S1008). This is a process in which the coefficient multiplying section 147 multiplies the reference correction current Icb calculated in the S1002, the deceleration coefficient Kd set in the S1006 and the deceleration determination coefficient Kj set in the S1007 to thereby calculate the multiplication value Icbc.

The setting section 120 sets a vehicle speed coefficient Kv (S1009). This is a process in which the coefficient Kv setting section 148 calculates the vehicle speed coefficient Kv based on the vehicle speed Vc as described above.

The setting section 120 sets a correction current Ic (S1010). This is a process in which the correction current setting section 149 sets a value obtained by multiplying the multiplication value Icbc calculated in the S1008 and the vehicle speed coefficient Kv set in the S1009, as the correction current Ic.

The setting section 120 sets a target current It (S1011). This is a process in which the target setting section 123 sets a value obtained by adding the reference current Ib set in the S1001 and the correction current Ic set in the S1010, as the target current It.

As described above, the setting section 120 performs the target current setting process to set the target current It. Thus, the control device 100 controls the damping force of the damping device 200 by the following method.

That is, the method for controlling the damping force of the damping device 200 damping a force generated between the vehicle body 10 and the wheel is characterized by multiplying the longitudinal acceleration Xg of the vehicle body 10 and the differential value DXg of the longitudinal acceleration Xg to thereby calculate the multiplication value MXg, and controlling the damping force by use of the calculated multiplication value MXg. The longitudinal acceleration Xg of the vehicle body 10 is detected by the longitudinal G sensor 50 which is an example of a longitudinal acceleration sensor.

Here, when the absolute value |MXg| of the multiplication value MXg is equal to or larger than the second predetermined multiplication value M2 which is an example of a predetermined value determined in advance, the damping force may be made larger than the damping force when the absolute value |MXg| is smaller than the second predetermined multiplication value M2.

In addition, when the longitudinal acceleration Xg detected by the longitudinal G sensor 50 is equal to or lower than a first predetermined value X1 which is an example of a predetermined acceleration determined in advance, the damping force may be made smaller than the damping force when the longitudinal acceleration Xg is higher than the first predetermined value X1.

In addition, a base damping force based on a change velocity of a relative displacement between the vehicle body 10 and the wheel may be corrected by use of the multiplication value MXg, to thereby control the damping force of the damping device 200.

In addition, the base damping force based on the change velocity of the relative displacement between the vehicle body 10 and the wheel may be corrected by use of the multiplication value MXg and the longitudinal acceleration Xg detected by the longitudinal G sensor 50, to thereby control the damping force of the damping device 200.

In addition, when the speed of the vehicle body 10 is higher than the predetermined vehicle speed Vc1 which is an example of a predetermined speed determined in advance, the damping force may be made larger than the damping force when the speed of the vehicle body 10 is equal to or lower than the predetermined speed Vc1.

That is, the control device 100 first multiplies the longitudinal acceleration Xg of the vehicle body 10 detected by the longitudinal G sensor 50 and the differential value of the longitudinal acceleration Xg to thereby calculate the multiplication value MXg in the step 1004 shown in FIG. 10. Then, the control device 100 calculates the absolute value |MXg| of the calculated multiplication value MXg in the step 1005 shown in FIG. 10, and sets the deceleration coefficient Kd by use of the calculated absolute value |MXg| in the step 1006. In addition, the control device 100 calculates the multiplication value Icbc by use of the calculated deceleration coefficient Kd in the step 1008, sets the correction current Ic by use of the multiplication value Icbc in the step 1010, and sets the target current It by use of the set correction current Ic in the step 1011. Thus, the control device 100 finally sets the target current It by use of the calculated multiplication value MXg to thereby control the damping force of the damping device 200.

In addition, as shown in FIG. 7, when the absolute value |MXg| is equal to or larger than the second predetermined multiplication value M2, the coefficient Kd setting section 145 sets the deceleration coefficient Kd as 1. When the absolute value |MXg| is smaller than the second predetermined multiplication value M2, the coefficient Kd setting section 145 sets the deceleration coefficient Kd as a value smaller than 1. Therefore, when the absolute value |MXg| is equal to or larger than the second predetermined multiplication value M2, the control device 100 makes the correction current Ic larger than the correction current Ic when the absolute value |MXg| is smaller than the second predetermined multiplication value M2. As a result, when the absolute value |MXg| is equal to or larger than the second predetermined multiplication value M2, the control device 100 makes the damping force of the damping device 200 larger than the damping force of the damping device 200 when the absolute value |MXg| is smaller than the second predetermined multiplication value M2.

In addition, as shown in FIG. 8, when the absolute value |Xg| is equal to or smaller than the first predetermined value X1, the coefficient Kj setting section 146 sets the deceleration determination coefficient Kj as 0. When the absolute value |Xg| is larger than the first predetermined value X1, the coefficient Kj setting section 146 sets the deceleration determination coefficient Kj as a value larger than 0. Therefore, when the absolute value |Xg| is equal to or smaller than the first predetermined value X1, the control device 100 makes the correction current Ic smaller than the correction current Ic when the absolute value |Xg| is larger than the first predetermined value X1. As a result, when the longitudinal acceleration Xg detected by the longitudinal G sensor 50 is equal to or smaller than the first predetermined value X1, the control device 100 makes the damping force of the damping device 200 smaller than the damping force of the damping device 200 when the longitudinal acceleration Xg is larger than the first predetermined value X1.

In addition, the control device 100 calculates the reference current Ib which will be the base of a base damping force in the step 1001 shown in FIG. 10. In addition, the control device 100 calculates the absolute value |MXg| of the multiplication value MXg in the step 1005, and sets the deceleration coefficient Kd by use of the calculated absolute value |MXg| in the step 1006. In addition, the control device 100 calculates the multiplication value Icbc by use of the deceleration coefficient Kd in the step 1008, and sets the correction current Ic by use of the multiplication value Icbc in the step 1010. In addition, the control device 100 sets the value obtained by adding the reference current Ib and the correction current Ic, as the target current It in the S1011. In other words, the control device 100 corrects the base damping force by use of the multiplication value MXg to thereby control the damping force of the damping device 200.

In addition, the control device 100 calculates the reference current Ib which will be the base of the base damping force in the step 1001 shown in FIG. 10. In addition, the control device 100 calculates the absolute value |MXg| of the multiplication value MXg in the step 1005, and sets the deceleration coefficient Kd by use of the calculated absolute value |MXg| in the step 1006. In addition, the control device 100 sets the deceleration determination coefficient Kj by use of the absolute value |Xg| of the longitudinal acceleration Xg in the step 1007, and calculates the multiplication value Icbc by use of the deceleration coefficient Kd and the deceleration determination coefficient Kj in the step 1008. The control device 100 sets the correction current Ic by use of the multiplication value Icbc in the step 1010, and sets the value obtained by adding the reference current Ib and the correction current Ic, as the target current It in the S1011. In other words, the control device 100 corrects the base damping force by use of the multiplication value MXg and the longitudinal acceleration Xg to thereby control the damping force of the damping device 200.

In addition, as shown in FIG. 9, when the vehicle speed Vc is higher than the predetermined vehicle speed Vc1, the coefficient Kv setting section 148 sets the vehicle speed coefficient Kv as 1. When the vehicle speed Vc is equal to or lower than the predetermined vehicle speed Vc1, the coefficient Kv setting section 148 sets the vehicle speed coefficient Kv as 0. Therefore, when the vehicle speed Vc is higher than the predetermined vehicle speed Vc1, the control device 100 makes the correction current Ic larger than the correction current Ic when the vehicle speed Vc is equal to or lower than the predetermined vehicle speed Vc1. As a result, when the vehicle speed Vc is higher than the predetermined vehicle speed Vc1, the control device 100 makes the damping force of the damping device 200 larger than the damping force of the damping device 200 when the vehicle speed Vc is equal to or lower than the predetermined vehicle speed Vc1.

As described above, the suspension apparatus 20 according to the present embodiment is provided with the damping device 200 which damps the force generated between the vehicle body 10 and the wheel, and the control device 100 which serves as an example of a control section controlling the damping force of the damping device 200. The control device 100 has the multiplication section 143 as an example of a multiplication section which multiplies the longitudinal acceleration Xg of the vehicle body 10 detected by the longitudinal G sensor 50 and the differential value DXg of the longitudinal acceleration Xg to thereby obtain the multiplication value MXg.

Figure 11:
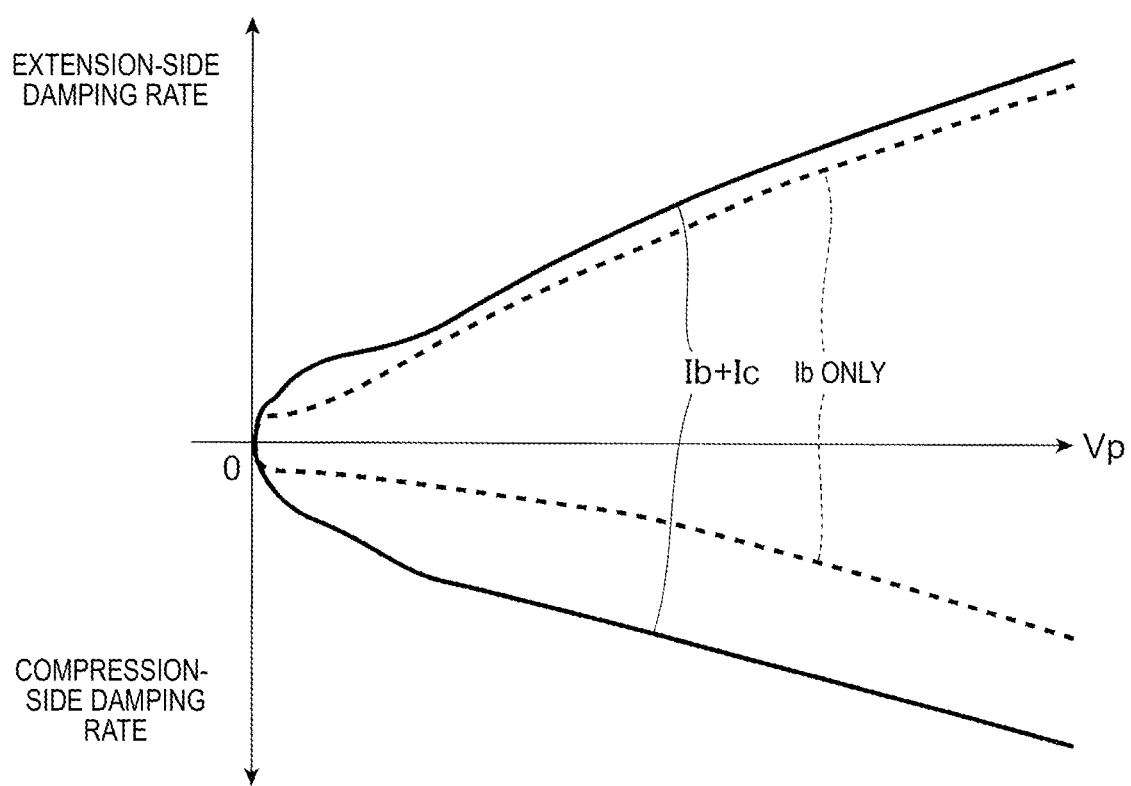
FIG. 11 is a view showing an example of the relation between the stroke velocity and a damping force.

FIG. 11 is a view showing an example of the relation between the stroke velocity Vp and the damping force. Incidentally, the abscissa shown in FIG. 11 expresses an absolute value of the stroke velocity Vp.

The control device 100 adds the correction current Ic set by use of the multiplication value MXg or the longitudinal acceleration Xg, to the reference current Ib corresponding to the stroke velocity Vp to thereby set the target current It. Thus, as illustrated in FIG. 11, the amount of the current fed to the solenoid of the damping force control valve 240 increases by the correction current Ic on the occasion of the deceleration. Accordingly, the damping force increases. As a result, nosedive is more difficult to occur than in a case where the correction current Ic is not added in setting the target current It. In the present invention, when the correction current Ic is set by use of the multiplication value MXg, it is possible to distinguish the hard braking from a light brake operation or it is possible to distinguish an occasion of gentle deceleration, an occasion of making a turn or an occasion of passing through a gap in a road surface. Further, when the correction current Ic is set by use of the multiplication value MXg and the longitudinal acceleration Xg, it is possible to distinguish passage through a rough road or a slalom, which cannot be distinguished by only the multiplication value MXg.

The correction setting section 122 according to the present embodiment sets the deceleration coefficient Kd based on the absolute value (|MXg|) of the multiplication value MXg in setting the correction current Ic. The multiplication value MXg is obtained by multiplying the longitudinal acceleration Xg and the differential value DXg of the longitudinal acceleration Xg. As shown in FIG. 7, when the absolute value |MXg| is equal to or smaller than the second predetermined multiplication value M2, the deceleration coefficient Kd is set to be smaller than 1. When the absolute value |MXg| is larger than the second predetermined multiplication value M2, for example, on an occasion of hard braking, the deceleration coefficient Kd is set as 1. Therefore, when, for example, the second predetermined multiplication value M2 is set as the aforementioned predetermined value with which the occasion of the hard braking can be distinguished, for example, from any of an occasion of a light brake operation, an occasion of gentle deceleration, an occasion of making a turn and an occasion of passing through a gap in a road surface. Thus, the correction current Ic on any of the occasion of the light brake operation, the occasion of the gentle deceleration, the occasion of making the turn and the case of passing through the gap in the road surface is smaller than the correction current Ic on the occasion of the hard braking. Thus, it is possible to increase the damping force on the occasion of the hard braking to settle down the pitching motion smoothly. At the same time, the damping force, for example, on any of the occasion of the light brake operation, the occasion of the gentle deceleration, the occasion of making the turn and the occasion of passing through the gap in the road surface is smaller than the damping force on the occasion of the hard braking. As a result, it is possible to accurately suppress shock absorbing performance from deteriorating due to a side effect accompanying the fact that the pitching motion can be settled down smoothly on the occasion of the hark braking.

In addition, in the correction setting section 122 according to the present embodiment, the deceleration determination coefficient Kj is set based on the absolute value |Xg| of the longitudinal acceleration Xg. For example, on an occasion of travelling on a rough road or a slalom, the differential value DXg of the longitudinal acceleration Xg takes an excessive value. Therefore, even though it is not the occasion of the sudden deceleration, the multiplication value MXg increases and the correction current Ic increases. As a result, there is a fear that the damping force increases. Therefore, in consideration of the fact that the longitudinal acceleration Xg on the occasion of travelling on the rough road or the slalom is equal to or lower than the longitudinal acceleration Xg on the occasion of the sudden deceleration, for example, the first predetermined value X1 (e.g. 0.2 G) is set as an upper limit value of the longitudinal acceleration Xg considered to be generated on the occasion of travelling on the rough road or the slalom. Thus, on the occasion of travelling on the rough road or the slalom, the absolute value |Xg| of the longitudinal acceleration Xg is equal to or smaller than the first predetermined value X1 so that the deceleration determination coefficient Kj is 0. Accordingly, the aforementioned correction current Ic is 0. As a result, the damping force on the occasion of travelling on the rough road or the slalom can be made smaller than the damping force on the occasion of the sudden deceleration. Accordingly, it is possible to accurately suppress the shock absorbing performance from deteriorating due to the damping force made excessive on the occasion of travelling on the rough road or the slalom.

In addition, setting in the correction setting section 122 according to the present embodiment is made as follows. That is, when the vehicle speed Vc is equal to or lower than the predetermined vehicle speed Vc1, the vehicle speed coefficient Kv is 0. When the vehicle speed Vc is higher than the predetermined vehicle speed Vc1, the vehicle speed coefficient Kv is 1. Thus, when the vehicle speed Vc is higher than the predetermined vehicle speed Vc1, the damping force can be made larger than the damping force when the vehicle speed Vc is equal to or lower than the predetermined vehicle speed Vc1. When the vehicle speed Vc is equal to or lower than the predetermined vehicle speed Vc1, the correction current can be set as 0. As a result, it is possible to accurately suppress the shock absorbing performance from deteriorating due to the damping force increased on an occasion of parking or travelling at an extremely low speed.

According to the suspension apparatus 20 according to the present embodiment, as described above, it is possible to accurately determine whether sudden deceleration has been attempted or not. When the sudden deceleration has been attempted, pitching motion can be settled down smoothly. In addition, while it is possible to smoothly settle down the pitching motion on the occasion of the sudden deceleration, it is possible to accurately suppress shock absorbing performance on any of an occasion of a light brake operation, an occasion of gentle deceleration, an occasion of making a turn, an occasion of passing through a gap in a road surface, an occasion of travelling on a rough road or a slalom, and an occasion of parking or travelling at an extremely low speed.

The aforementioned process performed by the control device 100 can be carried out by software and hardware resources cooperating with each other. In this case, a CPU inside a control computer provided in the control device 100 executes a program for implementing the respective functions of the control device 100 to thereby implement the respective functions. For example, a non-transitory computer-readable recording medium having the program recorded therein is provided to the control device 100, and the CPU of the control device 100 reads the program stored in the recording medium. In this case, the program per se read from the recording medium implement the functions of the aforementioned embodiment. Accordingly, the program per se and the recording medium having the program recorded therein constitute the present invention. For example, a flexible disk, a CD-ROM, a DVD-ROM, a hard disk, an optical disk, an magnetooptical disk, a CD-R, a magnetic tape, a non-volatile memory card, and an ROM can be enumerated as examples of the recording medium for supplying such a program.

Figure 12:
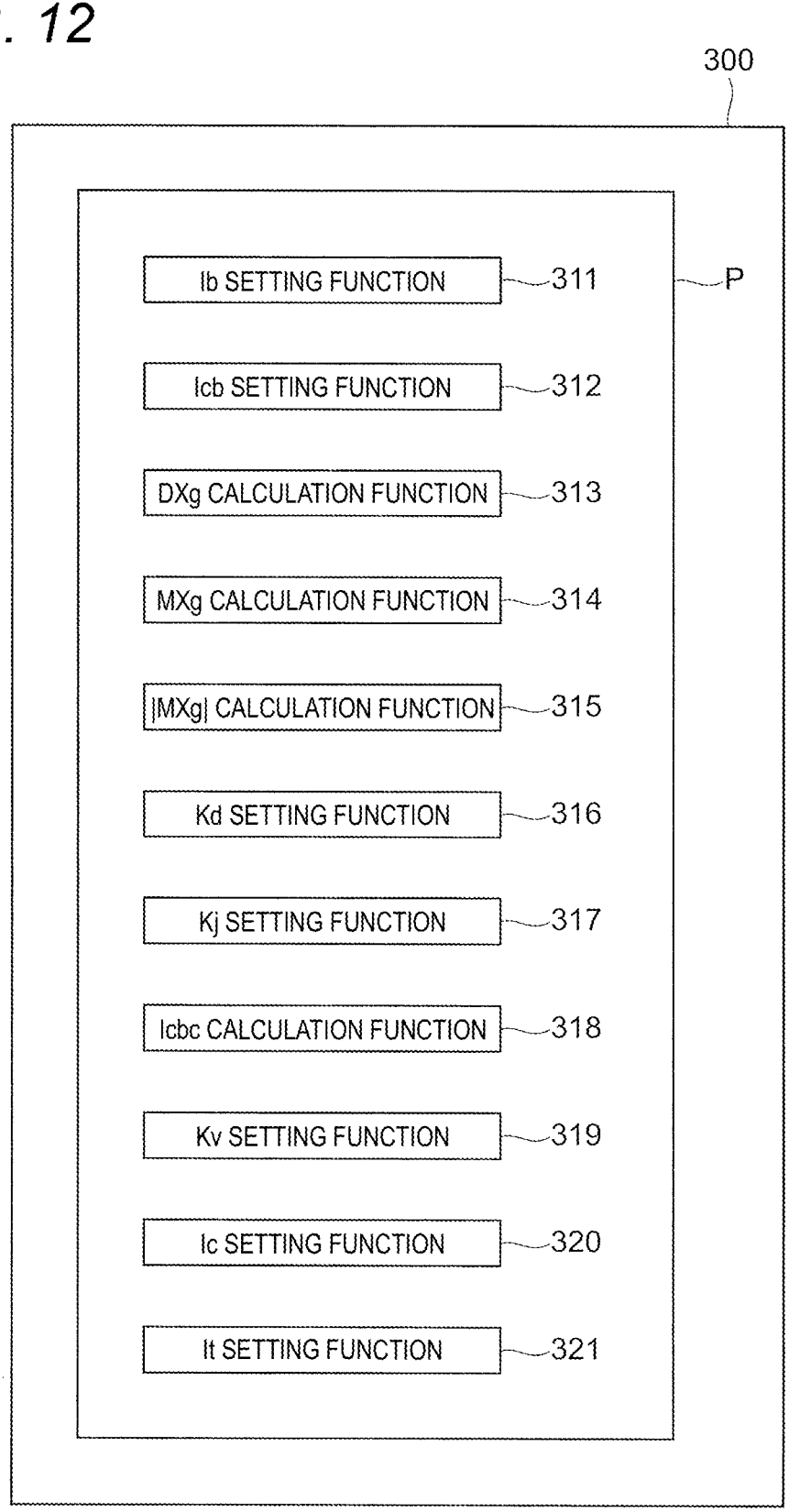
FIG. 12 is a diagram showing a schematic configuration of a recording medium according to the present embodiment.

FIG. 12 is a diagram showing a schematic configuration of a recording medium 300 according to the present embodiment. The recording medium 300 is a non-transitory computer-readable recording medium in which a program for making a computer implement a function of controlling a damping force of the damping device 200 has been recorded.

As shown in FIG. 12, the recording medium 300 according to the present embodiment stores a program P. The program P includes an Ib setting function 311 of setting a reference current Ib, an Icb setting function 312 of setting a reference correction current Icb, and a DXg calculation function 313 of calculating a differential value DXg of a longitudinal acceleration Xg. In addition, the program P includes an MXg calculation function 314 of calculating a multiplication value MXg, an |MXg| calculation function 315 of calculating an absolute value |MXg|, and a Kd setting function 316 of setting a deceleration coefficient Kd. In addition, the program P includes a Kj setting function 317 of setting a deceleration determination coefficient Kj, and an Icbc calculation function 318 of calculating a multiplication value Icbc. In addition, the program P includes a Kv setting function 319 of setting a vehicle speed coefficient Kv, an Ic setting function 320 of setting a correction current Ic, and an It setting function 321 of setting a target current It.

The Ib setting function 311 is a module implementing the function of the reference setting section 121 shown in FIG. 3.

The Icb setting function 312 is a module implementing the function of the reference correction setting section 141 shown in FIG. 5.

The DXg calculation function 313 is a module implementing the function of the differential processing section 142 shown in FIG. 5.

The MXg calculation function 314 is a module implementing the function of the multiplication section 143 shown in FIG. 5.

The |MXg| calculation function 315 is a module implementing the function of the absolute value generating section 144 shown in FIG. 5.

The Kd setting function 316 is a module implementing the function of the coefficient Kd setting section 145 shown in FIG. 5.

The Kj setting function 317 is a module implementing the function of the coefficient Kj setting section 146 shown in FIG. 5.

The Icbc setting function 318 is a module implementing the function of the coefficient multiplying section 147 shown in FIG. 5.

The Kv setting function 319 is a module implementing the function of the coefficient Kv setting section 148 shown in FIG. 5.

The Ic setting function 320 is a module implementing the function of the correction current setting section 149 shown in FIG. 5.

The It setting function 321 is a module implementing the function of the target setting section 123 shown in FIG. 3.

As described above, the recording medium 300 according to the present embodiment is a non-transitory computer-readable recording medium in which the program for making the computer implement the function of controlling the damping force of the damping device 200 has been recorded. The recorded program makes the computer implement the function of controlling the damping force of the damping device 200 by use of the multiplication value MXg. The multiplication value MXg is obtained by multiplying the longitudinal acceleration Xg of the vehicle body 10 detected by the longitudinal G sensor 50 and the differential value DXg of the longitudinal acceleration Xg.

Incidentally, after the program read from the recording medium 300 may be written into an internal memory of the control computer provided in the control device 100, the CPU etc. may perform a portion or the whole of an actual process based on an instruction of the program so that the functions of the aforementioned embodiment can be implemented by the process.

In addition, the program of the software implementing the functions of the embodiment is distributed through a network, so that the program of the software can be stored in a recording means such as a hard disk or an ROM of the control device 100 or a recording medium such as a CD-RW or a CD-R. In use, the CPU of the control device 100 may read and execute the program stored in the recording means or the recording medium.

<First Modification>

The form in which the deceleration coefficient Kd is set to increase as the absolute value |MXg| increases when the absolute value |MXg| of the multiplication value MXg is larger than the first predetermined multiplication value M1 and smaller than the second predetermined multiplication value M2, as shown in the control map illustrated in FIG. 7, has been illustrated in the aforementioned embodiment. However, the present invention is not limited to such a form. For example, the present invention may set the first predetermined multiplication value M1 and the second predetermined multiplication value M2 as the same value, so as to set the deceleration coefficient Kd as 0 when the absolute value |MXg| of the multiplication value MXg is equal to or smaller than the second predetermined multiplication value M2 (the first predetermined multiplication value M1), and set the deceleration coefficient Kd as 1 when the absolute value |MXg| of the multiplication value MXg is larger than the second predetermined multiplication value M2 (the first predetermined multiplication value M1).

The second predetermined multiplication value M2 (the first predetermined multiplication value M1) is set as the aforementioned predetermined value with which an occasion of hard braking can be distinguished from any of an occasion of a light brake operation, an occasion of gentle deceleration, an occasion of making a turn, and an occasion of passing through a gap in a round surface. Thus, it is possible to set a correction current Ic to be larger than 0 only on the occasion of the hard braking, and set the correction current Ic as 0 on any of the occasion of the light brake operation, the occasion of the gentle deceleration, the occasion of making the turn, and the occasion of passing through the gap in the road surface. As a result, it is easy to increase a damping force only on the occasion of the hard braking, and not to increase the damping force on any of the occasion of the light brake operation, the occasion of the gentle deceleration, the occasion of making the turn, and the occasion of passing through the gap in the road surface.

<Second Modification>

The form in which the deceleration determination coefficient Kj is set to increase as the absolute value |Xg| increases when the absolute value |Xg| of the longitudinal acceleration Xg is larger than the first predetermined value X1 and smaller than the second predetermined value X2, as shown in the control map illustrated in FIG. 8, has been illustrated in the aforementioned embodiment. However, the present invention is not limited to such a form. For example, the present invention may set the first predetermined value X1 and the second predetermined value X2 as the same value, so as to set the deceleration determination coefficient Kj as 0 when the absolute value |Xg| of the longitudinal acceleration Xg is equal to or smaller than the first predetermined value X1 (the second predetermined value X2), and set the deceleration determination coefficient Kj as 1 when the absolute value |Xg| of the longitudinal acceleration Xg is larger than the first predetermined value X1 (the second predetermined value X2).

The first predetermined value X1 (the second predetermined value X2) is set as the longitudinal acceleration Xg (e.g. 0.2 G) on an occasion of travelling on a rough road or a slalom. Thus, it is possible to set the deceleration determination coefficient Kj as 0 on the occasion of travelling on the rough road or the slalom. At the same time, it is possible to set the deceleration determination coefficient Kj at 1 when the occasion of travelling on the rough road or the slalom cannot be accurately determined. As a result, it is possible to suppress shock absorbing performance from deteriorating due to a damping force made excessive on the occasion of travelling on the rough road or the slalom. At the same time, it is possible to increase the damping force on an occasion of sudden deceleration which is not the occasion of travelling on the rough road or the slalom, so as to settle down pitching motion smoothly.

<Third Modification>

The damping device according to the present invention is not limited to the configuration in which the damping force control valve 240 or the working oil flow paths (e.g. the first oil path 231 etc.) for generating the damping force are provided outside the cylinder 210, as shown in FIG. 2. For example, the damping force control valve 240 or the working oil flow paths for generating the damping force may be disposed inside the cylinder 210.

In addition, the damping device according to the present invention may be provided with a compression-side damping force control valve and an extension-side damping force control valve separately. The compression-side damping force control valve changes a damping force (compression-side damping force) generated at a compression stroke. The extension-side damping control valve changes a damping force (extension-side damping force) generated at an extension stroke.

REFERENCE SIGNS LIST

1 . . . motorcycle, 2 . . . front wheel, 3 . . . rear wheel, 13 . . . brake lever, 20 . . . suspension apparatus, 21 . . . suspension, 22 . . . suspension, 100 . . . control device, 110 . . . calculation section, 120 . . . setting section, 122 . . . correction setting section, 130 . . . drive section, 142 . . . differential processing section, 143 . . . multiplication section, 200 . . . damping device, 240 . . . damping force control valve

The invention claimed is:

1. A suspension apparatus mounted on a motorcycle, the suspension apparatus comprising:
 a front wheel-side damper which damps a force generated between a vehicle body and a front wheel;
 a rear wheel-side damper which damps a force generated between the vehicle body and a rear wheel; and
 a CPU which controls a damping force of the front wheel-side damper and a damping force of the rear wheel-side damper; wherein:
 the CPU is configured to multiply a longitudinal acceleration of the vehicle body detected by a longitudinal acceleration sensor and a differential value of the longitudinal acceleration to thereby obtain a multiplication value, and
 when an absolute value of the multiplication value is equal to or larger than a predetermined value determined in advance, the CPU makes the damping force of the front wheel-side damper larger than the damping force when the absolute value is smaller than the predetermined value and makes the damping force of the rear wheel-side damper larger than the damping force when the absolute value is smaller than the predetermined value.

2. The suspension apparatus according to claim 1, wherein:
the CPU corrects a base damping force based on a change velocity of a relative displacement between the vehicle body and the wheel by use of the multiplication value, to thereby control the damping force of the damper.

3. A suspension apparatus comprising:
a front wheel-side damper which damps a force generated between a vehicle body and a front wheel;
a rear wheel-side damper which damps a force generated between the vehicle body and a rear wheel and
a CPU which controls a damping force of the front wheel-side damper and a damping force of the rear wheel-side damper; wherein:
the CPU is configured to multiply a longitudinal acceleration of the vehicle body detected by a longitudinal acceleration sensor and a differential value of the longitudinal acceleration to thereby obtain a multiplication value;
when the longitudinal acceleration detected by the longitudinal acceleration sensor is equal to or lower than a predetermined acceleration determined in advance, the CPU makes the damping force of the front wheel-side damper smaller than the damping force when the longitudinal acceleration is higher than the predetermined acceleration and makes the damping force of the rear wheel-side damper smaller than the damping force when the longitudinal acceleration is higher than the predetermined acceleration; and
the CPU corrects a base damping force based on a change velocity of a relative displacement between the vehicle body and the wheel by use of the multiplication value and the longitudinal acceleration detected by the longitudinal acceleration sensor, to thereby control the damping force of the damper.

4. The suspension apparatus according to claim 2, wherein:
the CPU adds a correction damping force for correcting the base damping force to the base damping force to thereby correct the base damping force; and
the CPU corrects a reference correction damping force corresponding to the change velocity by use of a correction coefficient corresponding to an absolute value of the multiplication value, a correction coefficient corresponding to an absolute value of the longitudinal acceleration, and a correction coefficient corresponding to a speed of the vehicle body to thereby calculate the correction damping force.

5. The suspension apparatus according to claim 3, wherein:
the CPU adds a correction damping force for correcting the base damping force to the base damping force to thereby correct the base damping force; and
the CPU corrects a reference correction damping force corresponding to the change velocity by use of a correction coefficient corresponding to an absolute value of the multiplication value, a correction coefficient corresponding to an absolute value of the longitudinal acceleration, and a correction coefficient corresponding to a speed of the vehicle body to thereby calculate the correction damping force.

6. The suspension apparatus according to claim 1, wherein:
when a speed of the vehicle body is higher than a predetermined speed determined in advance, the CPU makes the damping force larger than the damping force when the speed of the vehicle body is equal to or lower than the predetermined speed.

7. The suspension apparatus according to claim 2, wherein:
when a speed of the vehicle body is higher than a predetermined speed determined in advance, the CPU makes the damping force larger than the damping force when the speed of the vehicle body is equal to or lower than the predetermined speed.

8. The suspension apparatus according to claim 3, wherein:
when a speed of the vehicle body is higher than a predetermined speed determined in advance, the CPU makes the damping force larger than the damping force when the speed of the vehicle body is equal to or lower than the predetermined speed.

9. The suspension apparatus according to claim 4, wherein:
when a speed of the vehicle body is higher than a predetermined speed determined in advance, the CPU makes the damping force larger than the damping force when the speed of the vehicle body is equal to or lower than the predetermined speed.

10. The suspension apparatus according to claim 5, wherein:
when a speed of the vehicle body is higher than a predetermined speed determined in advance, the CPU makes the damping force larger than the damping force when the speed of the vehicle body is equal to or lower than the predetermined speed.

* * * * *